United States Patent Office 3,606,762
Patented Sept. 21, 1971

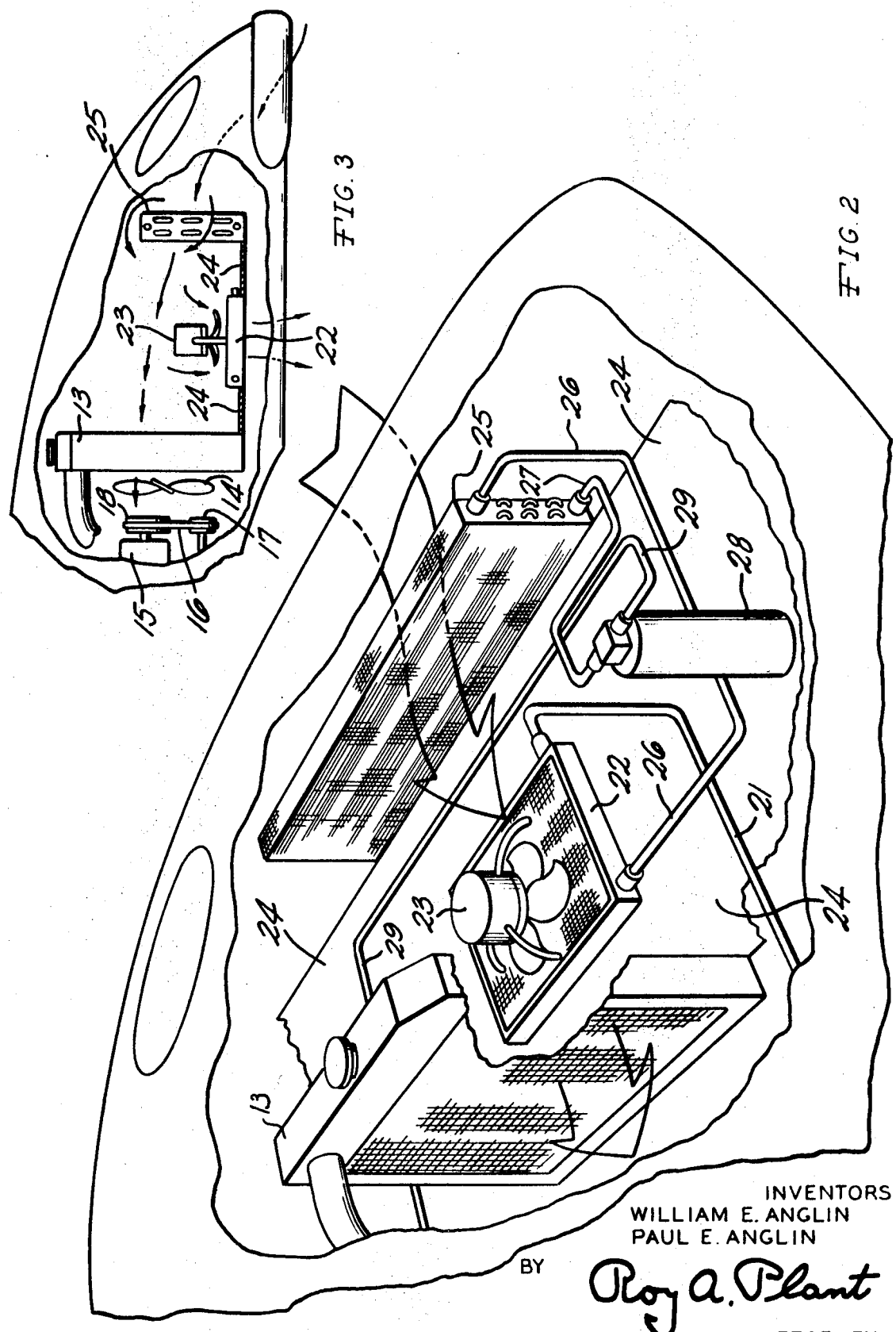

3,606,762
METHOD AND APPARATUS FOR AIR CONDITIONING AUTOMOBILES AND THE LIKE
Paul E. Anglin and William E. Anglin, Dallas, Tex., assignors to William E. Anglin, Paul E. Anglin, and Trammell Crow Investment Company, all of Dallas, Tex., fractional part interest to each
Filed Oct. 24, 1969, Ser. No. 869,114
Int. Cl. B60h 3/04
U.S. Cl. 62—61                                                7 Claims

ABSTRACT OF THE DISCLOSURE

This automobile air conditioning system utilizes a refrigerant condenser system, preferably of the relatively flat interconnected compartment type, or if desired the conventional tubular type, mounted in front of the automobile radiator, preferably spaced a considerable distance forward of same, with an additional section for receiving the superheated refrigerant gas direct from the compressor. Independent means are provided for forcing cooling air through this additional section and generally out below the automobile radiator so as to not disturb the normal engine cooling operation of the latter. The thus precooled refrigerant then passes through said refrigerant condenser preferably well forward of and in front of the automobile radiator, with the refrigerant gas condensation being substantially completed in this condenser ready for delivery to and through the conventional refrigerant expansion valve and evaporation chamber of the air conditioning system.

BACKGROUND OF THE INVENTION

The present invention involves a modification and improvement on the refrigeration system of our co-pending U.S. patent application Ser. No. 720,164, filed Apr. 10, 1968, now Pat. No. 3,479,834. While that invention involves a highly successful automobile air conditioning system with its separate refrigerant superheat removing section below the automobile radiator, where its efficiency is enhanced by the forward movement of the atuomobile, we have found that the efficiency of this superheat removing section can be still further enhanced by forcing air through same under all conditions of operation and with the cooling air being delivered from the superheat removing condenser, preferably so as to pass under or otherwise bypass the automobile radiator under normal conditions of operation, while having little or no reducing effect on the automobile radiator's cooling capacity for the automobile engine cooling liquid. It was a recognition of the need of improving the removal of superheat from the refrigerant gas received from the compressor as well as increasing the effectiveness of the automobile radiator in cooling the engine cooling liquid which led to the conception and development of the present invention.

In view of the above considerations this invention relates broadly to refrigeration systems, and in its more specific phases to improvements in air conditioners for use in automobiles so as to provide still better and greater refrigeration capacity per given quantity of refrigerant vaporated and circulated through the refrigeration system, while keeping the automobile radiator cooling capacity high.

The air conditioning of automobiles has become more and more popular as time passes due not only to the desire to be more comfortable during hot weather use of an automobile, but also that by closing the automobile windows, while operating the air conditioner, considerable noise is eliminated, and the occupants' hair does not get blown and disheveled, but further, dust and pollen are largely eliminated from inside the automobile passenger area which helps in keeping the occupants clean as well as aids the breathing of those who have allergies involving dust and pollen, and especially hay fever sufferers. The present invention has been devised with a special view to improving automobile air conditioning systems so as to make them more efficient and have a greater refrigeration capacity for improved air conditioning effect, while allowing the automobile radiator to operate near maximum efficiency even with the air conditioner in full operation and the automobile standing still.

SUMMARY OF THE INVENTION

Accordingly, an object of the present invention is to provide increased refrigeration capacity per pound or given quantity of refrigerant circulating in the air conditioner circuit.

Another object is to provide improved dissipation of heat in the compressed refrigerant gas, with reduced interference with the proper operation of the automobile radiator for cooling the automobile engine coolant.

Another object is to provide means for more efficiently dissipating the superheat in the compressed refrigerant gas delivered direct from the compressor before further cooling and condensing of the compressed refrigerant gas as is currently conventionally done by the sole installation of a refrigerant gas condenser directly in front of, close to, and parallel to the automobile radiator wherein the automobile fan, in conventional operation, first draws air through the refrigerant gas condenser unit and then through the automobile radiator with the thus preheated air reducing the cooling efficiency of the radiator.

A further object is to provide a more efficient refrigerant gas condensing system wherein the refrigerant condenser is preferably set in upright position well forward of the automobile radiator so as to provide a compartment between same and with a shielding panel extending forward substantially horizontally from the bottom portion of the radiator to said condenser, with cooling air passing into said compartment both through and around said condenser, and with a superheat dissipating condenser connected to said compartment through said shielding panel, with an electric fan for forcing air from said compartment through said superheat dissipating condenser and out under said shielding panel so as to substantially avoid passing through said radiator which would reduce its cooling efficiency.

A still further object is to provide an improved and highly efficient method of air conditioning an automobile or other apparatus.

Still further objects and advantages of this invention will appear as the description proceeds.

To the accomplishment of the foregoing and related ends, the invention, then, consists of the method and means for air conditioning automobiles or other apparatus, hereinafter fully described and pointed out in the claims, the annexed drawings, and the following description setting forth in detail certain means and modes for carrying out the invention, such disclosed means and modes illustrating, however, but one of the various ways in which the principle of the invention may be used.

BRIEF DESCRIPTION OF THE DRAWINGS

In the annexed drawings:

FIG. 2 shows fragmentarily in enlarged perspective view from the rear the portion of the refrigerant condenser system which is normally mounted in front of the automobile radiator.

FIG. 3 shows a fragmentary schematic and diagrammatic side view of the combination shown in FIG. 2, with the air flow direction shown by the arrows.

DESCRIPTION OF SPECIFIC EMBODIMENTS

Figure 1:
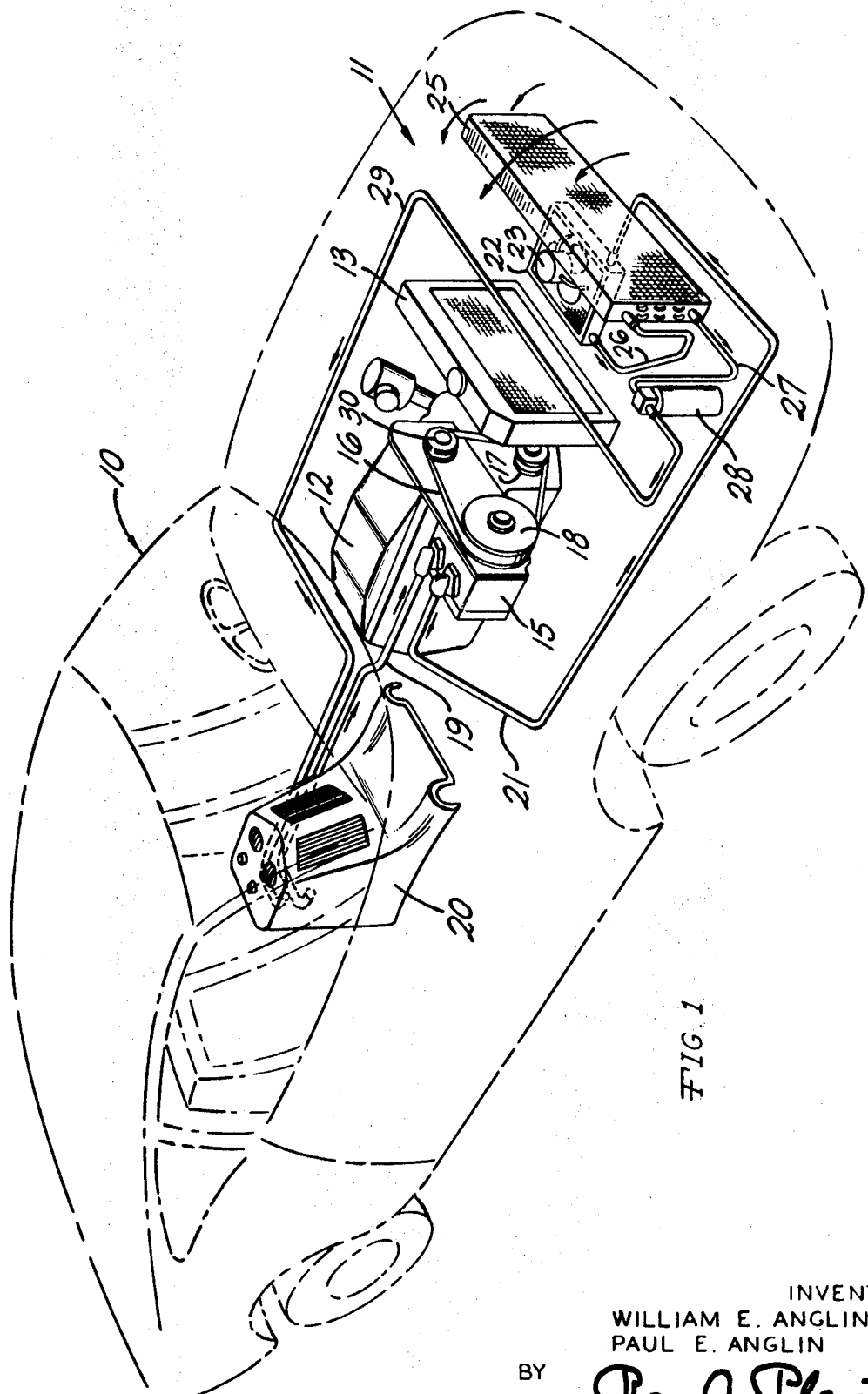
FIG. 1 shows in dashed lines the outline of an automobile with the present improved air conditioning system conventionally shown in front perspective in operating position.

Referring more particularly to FIG. 1 of the drawings, an automobile 10 is schematically shown with a preferred form of the present improved air conditioning system 11 diagrammatically shown in operating position. The automobile 10 has the conventional power plant or engine 12, radiator 13, and fan 14 (FIG. 3) in their usual arrangement and position.

The refrigerant compressor 15, FIG. 1, may be mounted, as usual, at the side of engine 12 and driven by means of a belt 16 passing around power drive pulley 17 of the engine, belt tightening idler pulley 30, and driven pulley 18 of compressor 15. Our co-pending application Ser. No. 720,164 shows a belt drive arrangement adaptable for use here, and which is especially advantageous where the space between the engine and radiator is very limited, such as in the Opel Kadett.

As shown in FIG. 1, the expanded refrigerant gas is delivered to compressor 15 by conductor 19 from the air conditioning unit 20 (which has the conventional refrigerant expansion valve, refrigerant evaporation radiator, and fan, not shown) and this gas after compression, which is then in superheated form, is then delivered by conductor 21 to the superheat dissipating condenser 22. Preferably mounted in conventional operative manner above superheat dissipating condenser 22 is an electrically driven fan 23 which forces cooling air through the condenser 22 to remove at least part if not all of the superheat in the refrigerant gas flowing therethrough. The so-heated air passes down under the automobile radiator 13 and backward under the automobile engine 12 under normal driving conditions. A shield 24 of panel form is preferably used as shown in FIG. 3, to improve the operation of the air conditioning system as well as keep the hot air flowing from the superheat condenser 22 from passing through the automobile radiator which would reduce its cooling capacity.

From the superheat dissipating condenser 22, FIGS. 1 and 2, the refrigerant is delivered to the top of refrigerant condenser 25 by means of conductor 26, where the refrigerant gas as condensed flows to the bottom of condenser 25 and thence by conductor 27 to a conventional receiver 28 where the condensed refrigerant is treated to remove moisture, air, or both, if present. From receiver 28, FIG. 1, the condensed refrigerant is delivered by conductor 29 to the expansion valve (not shown) in the air conditioning unit 20 ready for expansion there and then return to compressor 15 through conductor 19 for recycling as before.

With the condenser 25 spaced forward of the radiator as illustrated, practically all heat radiation in either direction between condenser 25 and radiator 13 is eliminated, and air passing through condenser 25, as explained hereinafter in greater detail, is mixed with air passing around same so that fan 14 pulls cooler air through radiator 13, than would be the case if it all had passed through condenser 25, thus improving its efficiency and substantially eliminating overheating.

Referring more particularly to FIG. 3 of the drawings, it is to be noted that condenser 25 is spaced well forward of the automobile radiator 13, so that under forward motion of the automobile, such motion causes air to flow backward by ram effect both through condenser 25 and around the sides and top of same. This thus provides cooling effect for the refrigerant flowing through condenser 25, and yet the air flowing around said condenser mixes with the air flowing through it to provide cooler air for fan 14 to draw through radiator 13 than is the case with currently used air conditioning systems where the condenser 25 would be normally spaced an inch or less from the front of radiator 13, which would thus receive radiant heat and the hot air from condenser 25 would pass direct into the front of radiator 13 and thus drastically reduce its cooling capacity which is serious in extremely hot weather, which is commonly encountered during the summer in the southern part of the United States. Shield 24, which preferably is of panel form, and preferably extends from side to side of the compartment in front of radiator 13, and from radiator 13 to condenser 25, also keeps the hot air delivered from superheat dissipating condenser 22 from mixing with the cooling air flowing to and through radiator 13, thus again helping its operating efficiency.

The electric fan 23 for superheat condenser 22, would be connected to the air conditioner electric circuit so that this fan would only run when the air conditioner is operating, thus avoiding useless operation of electric fan 23 when air conditioning was not being used. It is to be noted that when the automobile is standing still with the motor idling, the rotation of fan 14, along with the superheat dissipating condenser electric fan 23, will draw air into the space (compartment) in front of radiator 13, with part of that air passing through refrigerant condenser 25, thus making same operational for the air conditioning system, while providing by mixing this warm air with the cool air flowing around condenser 25, a body of moderately cool air to pass through radiator 13 to retard any overheating of engine 12 and its cooling system. Some of this same mixed moderately cool air is also forced through the superheat dissipating condenser 22 by means of fan 23, to make same operational.

We therefore particularly point out and distinctly claim as our invention:

1. An improved method of air conditioning an automobile having a radiator for cooling an engine-cooling liquid and utilizing a fan for drawing cooling air through said radiator, which comprises the steps of:
   (a) compressing the refrigerant gas used for air conditioning said automobile,
   (b) transferring said compressed refrigerant gas, which is superheated due to compressing same, from the compressor to a superheat dissipating condenser,
   (c) supplying a separate means for forcing cooling air through said superheat dissipating condenser to remove superheat from said compressed refrigerant,
   (d) shielding said automobile radiator from the hot air delivered from said superheat dissipating condenser,
   (e) delivering the refrigerant from said superheat dissipating condenser to a condenser for condensing said refrigerant,
   (f) spacing said refrigerant condenser from said radiator sufficiently to substantially eliminate all passage of radiant heat between them,
   (g) mounting said refrigerant condenser in position to allow cooling air, under forward motion of said automobile, to both pass through same and around same for mixing in the space between said condenser and radiator before passing through the latter, and
   (h) lastly, passing said condensed refrigerant from said condenser to and through an expansion and heat absorbing air conditioning cycle and back to the point of recompressing same for recycling again.

2. In the method of air conditioning an automobile having an engine, and means for cooling the latter, wherein the procedure of compressing, condensing, and expanding the refrigerant in automobile air conditioning manner is carried out, which also includes the steps of
   (a) passing the refrigerant after being compressed, direct to and through a separate superheat dissipating condenser,
   (b) forcing cooling air through said superheat dissipating condenser whenever said air conditioning procedure is being carried out regardless of whether said automobile is in motion or not, and
   (c) guiding the heated air passing from the superheat dissipating condenser away from the engine cooling system to facilitate keeping its cooling efficiency high.

3. An air conditioning system for automobiles having an engine with a means for cooling the latter, comprising in combination:
   (a) a refrigerant gas compressor,
   (b) a superheat dissipating condenser for said compressed refrigerant gas,
   (c) means for positively forcing cooling air through said superheat dissipating condenser,
   (d) means for guiding the cooling air forced through said superheat dissipating condenser away from the engine cooling system,
   (e) said last named means being separate and independent from said radiator and its fan,
   (f) means delivering said compressed and superheated refrigerant gas from said compressor to said superheat dissipating condenser,
   (g) a condenser for said refrigerant gas which has passed through said superheat dissipating condenser,
   (h) means delivering said refrigerant from said superheat dissipating condenser to said refrigerant gas condenser, and
   (i) means for delivering the so-cooled and condensed refrigerant from said refrigerant gas condenser to and through an expansion valve and evaporator unit, where refrigeration takes place, and then back to said compressor for recycling.

4. An air conditioning system as set forth in claim 3, wherein
   (a) said means for forcing cooling air through said superheat dissipating condenser is an electric fan.

5. An air conditioning system as set forth in claim 3, wherein
   (a) there is a shield means between said engine cooling means and said superheat dissipating condenser to direct the hot air passing out of said superheat dissipating condenser away from said engine cooling means to facilitate keeping its cooling efficiency high.

6. An air conditioning system as set forth in claim 5, wherein
   (a) said engine cooling means includes a liquid coolant, a radiator for cooling same, and a fan for drawing cooling air through said radiator, and
   (b) said shield means is in the form of a substantially horizontal panel extending forward from the bottom of said radiator, with the side of said superheat dissipating condenser from which said forced cooling air emerges in heated form opening below said panel for normal flow past rather than through said radiator, during forward motion of the automobile.

7. An air conditioning system as set forth in claim 6, wherein said combination includes
   (a) an electric fan for forcing said cooling air through said superheat dissipating condenser, and
   (b) means delivering operating power to said electric fan whenever said air conditioning system is in operation.

References Cited
UNITED STATES PATENTS

| | | | |
|---|---|---|---|
| 2,009,882 | 7/1935 | Fourness | 62—305 |
| 2,742,765 | 4/1956 | Anderson | 62—243 |
| 2,774,220 | 12/1956 | Heym | 62—243 |
| 2,977,774 | 4/1961 | Ferris | 62—243 |
| 3,449,924 | 6/1969 | Sudmeier | 62—244 |
| 3,479,834 | 11/1969 | Anglin | 62—241 |

WILLIAM J. WYE, Primary Examiner

U.S. Cl. X.R.

62—241, 239, 244, 507